T. R. SINCLAIRE.
Improvement in Apparatus for Filtering Liquids.
No. 120,908.  Patented Nov. 14, 1871.
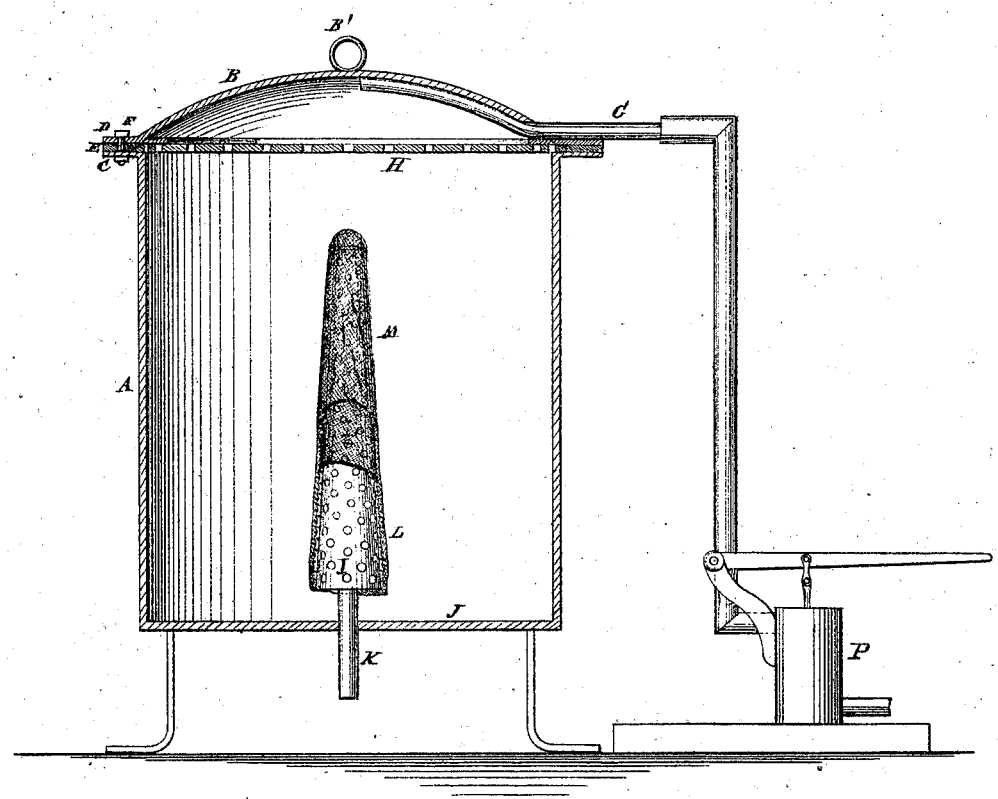
Witnesses:
A. W. Almqvist
Francis McArdle
Inventor:
T. R. Sinclaire
PER
[signature]
Attorneys.

*Reissued Oct. 15th 1872*

120,908

UNITED STATES PATENT OFFICE.

THOMAS R. SINCLAIRE, OF NEW YORK, N. Y.

IMPROVEMENT IN APPARATUS FOR FILTERING LIQUIDS.

Specification forming part of Letters Patent No. 120,908, dated November 14, 1871.

*To all whom it may concern:*

Be it known that I, THOMAS R. SINCLAIRE, of the city, county, and State of New York, have invented an Improvement in Apparatus for Filtering Liquids; and I do hereby declare that the following is a full, clear, and exact description thereof, which will enable others skilled in the art to make and use the same, reference being had to the accompanying drawing forming part of this specification.

The object of this invention is to overcome some difficulties which have been met with in the use of the filtering apparatus for which Letters Patent of the United States were granted me, dated April 27, 1869, and July 6, 1869; and it consists in a perforated tube or receiver within the filtering-vessel, of conical or other form, connected with the bottom of the vessel and extending upward therefrom, consisting of perforated metal, wire-gauze, and textile or fibrous material, or their equivalents, the same being surrounded by the charcoal or filtering material, the construction and arrangement being as hereinafter more fully shown and described.

The accompanying drawing represents a vertical section of the apparatus, showing the pump for forcing the liquid into the filtering-vessel, with my improvement attached to and supported by the bottom of the filtering-vessel.

Similar letters of reference indicate corresponding parts.

A is the filtering-vessel, which may be of any suitable size and form, provided with a conical or oval top or cover, B, with a ring or eye, B', for lifting and handling the same. C is a flange around the rim of the vessel. D is the cover-flange. E is packing between the two flanges. The cover is securely confined to the vessel by bolts F, so that the connection will allow liquids to be filtered under pressure. G is the pipe from the force-pump P, through which the liquid is discharged beneath the conical cover, as represented. H is a perforated plate, which is placed on top of the filtering material, and is held in position by the inwardly-projecting cover-flange D. I represents my interior perforated receiving-tube, attached to the bottom J of the vessel A by the delivery-tube K.

In this example of my invention I show a perforated conical tube extending from the delivery-tube to near the top of the vessel; but I do not confine myself to this or any other particular form, nor to this particular locality for the tube, nor to a single tube. This tube is covered with wire-gauze L, and outside of the wire-gauze is a covering of some textile or fibrous material, M.

The filtering-vessel is filled or nearly filled with charcoal or other filtering material for clarifying and purifying liquids. Charcoal is usually employed.

In filtering under pressure on the old plan, or without the interior receiving-tube I or its equivalent, more or less of the liquid, it has been found, will force its way between the charcoal and the side of the vessel, or through channels in the coal itself, and will consequently be but partially filtered or clarified, thus rendering the whole operation imperfect and unsatisfactory.

By the introduction of the receiving-tube I all the liquid is compelled to pass and to be regularly distributed through the body of the filtering material and into the perforated tube through the coverings thereof, by which operation all the liquid is thoroughly filtered and purified. I prefer to make the tube I conical or smaller at top than bottom, so that the main portion of the liquid will be obliged to pass through the mass of the charcoal or other material in seeking a sufficient outlet.

My main object is to thoroughly filter the liquid by forcing the same uniformly from all parts of the vessel toward the center or tube, and by the introduction of my perforated tube or receiver I the object is accomplished.

Having thus described my invention, I claim as new and desire to secure by Letters Patent—

In combination with a filtering-vessel and a force-pump, or its equivalent, the perforated tube or receiver I, substantially as and for the purposes herein shown and described.

THOS. R. SINCLAIRE.

Witnesses:
GEORGE W. MABEE,
T. B. MOSHER. (167)